United States Patent
Du et al.

(10) Patent No.: US 11,569,510 B2
(45) Date of Patent: Jan. 31, 2023

(54) TERNARY POSITIVE ELECTRODE MATERIAL WITH LOW GAS GENERATION AND HIGH CAPACITY

(71) Applicant: CONTEMPORARY AMPEREX TECHNOLOGY CO., LIMITED, Ningde (CN)

(72) Inventors: Rui Du, Ningde (CN); Sihui Wang, Ningde (CN); Yongchao Liu, Ningde (CN); Chi Luo, Ningde (CN); Deyu Zhao, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/518,744

(22) Filed: Nov. 4, 2021

(65) Prior Publication Data
US 2022/0085378 A1    Mar. 17, 2022

Related U.S. Application Data

(63) Continuation of application No. PCT/CN2020/084336, filed on Apr. 11, 2020.

(30) Foreign Application Priority Data

Jun. 28, 2019 (CN) ......................... 201910578176.8

(51) Int. Cl.
  *H01M 4/62*     (2006.01)
  *H01M 4/36*     (2006.01)
  *H01M 4/505*    (2010.01)
  *H01M 4/525*    (2010.01)
  *H01M 10/0525*  (2010.01)
  *H01M 4/02*     (2006.01)

(52) U.S. Cl.
  CPC ........... *H01M 4/628* (2013.01); *H01M 4/366* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2004/0265692 A1   12/2004   Long et al.
2008/0193846 A1    8/2008   Morishima

FOREIGN PATENT DOCUMENTS

| CN | 101246957 A   | 8/2008  |            |
|----|---------------|---------|------------|
| CN | 102598371 A * | 7/2012  | C01G 53/50 |
| CN | 103165830 A   | 6/2013  |            |
| CN | 103855380 A   | 6/2014  |            |
| CN | 107636869 A   | 1/2018  |            |
| CN | 108352525 A   | 7/2018  |            |
| CN | 108878795 A   | 11/2018 |            |
| EP | 3429000 A1    | 1/2019  |            |
| WO | 2019026630 A1 | 2/2019  |            |

OTHER PUBLICATIONS

ISR for International Application PCT/CN2020/084336 dated Jul. 16, 2020.
Written Opinion for International Application PCT/CN2020/084336 dated Jul. 16, 2020.
First Chinese Office Action for counterpart application 201910578176.8 dated Jun. 4, 2021.
Second Chinese Office Action for counterpart application 201910578176.8 dated Aug. 8, 2021.
First Office Action for counterpart Chinese application No. CN201910578176.8, dated Jun. 4, 2021.
Second Office Action for counterpart Chinese application No. 201910578176.8, dated Aug. 9, 2021.
Notification to grant patent right for counterpart Chinese application No. 201910578176.8, dated Nov. 10, 2021.
First Search Report for counterpart Chinese application No. 201910578176.8, dated May 21, 2021.
Supplemental European Search Report for counterpart application No. EP20833684, dated Mar. 28, 2022.
European Search Opinion for counterpart application No. EP20833684, dated Mar. 28, 2022.

* cited by examiner

*Primary Examiner* — Carlos Barcena
(74) *Attorney, Agent, or Firm* — Ladas & Parry LLP

(57) ABSTRACT

This disclosure relates to the field of electrochemistry, and in particular, to a positive electrode material. The positive electrode material of this disclosure includes a substrate, with a formula of the substrate being $Li_xNi_yCo_zM_kMe_pO_rA_m$, where $0.95 \leq x \leq 1.05$, $0.50 \leq y \leq 0.95$, $0 \leq z \leq 0.2$, $0 \leq k \leq 0.4$, $0 \leq p \leq 0.05$, $1 \leq r \leq 2$, $0 \leq m \leq 2$, $m+r \leq 2$; a coating layer is disposed on the subs hate, where the coating layer includes a coating element; and absorbance of nickel leachate per unit mass of the positive electrode material $w \leq 0.7$.

12 Claims, No Drawings

TERNARY POSITIVE ELECTRODE MATERIAL WITH LOW GAS GENERATION AND HIGH CAPACITY

CROSS-REFERENCE TO RELATED APPLICATIONS

This application is a continuation of International Patent Application No. PCT/CN2020/084336, filed on Apr. 11, 2020, which claims priority to the Chinese Patent Application No. 201910578176.8, filed on Jun. 28, 2019. The aforementioned patent applications are incorporated herein by reference in then entirety.

TECHNICAL FIELD

This disclosure relates to the field of electrochemistry, and in particular, to a ternary positive electrode material with low gas generation and high capacity, and an electrochemical energy storage apparatus.

BACKGROUND

With escalation of energy crisis and environmental issues, development of new-type green energy sources becomes extremely urgent. Lithium-ion batteries have been applied to various fields due to their advantages of a high specific energy, application at a wide range of temperatures, a low self-discharge rate, a long cycle life, good safety performance, and no pollution. Lithium-ion batteries acting as a vehicle energy system to replace conventional diesel locomotives have been gradually put into trial around the world. However, lithium iron phosphate ($LiFePO_4$) and low nickel ternary ($LiNi_{1/3}Co_{1/3}Mn_{1/3}O_2$) commonly used at present are limited by the material nature itself and cannot fully meet energy density requirements of traction batteries on the positive electrode material of lithium-ion batteries. Increasing nickel content of a high nickel ternary positive electrode material can improve the energy density of batteries. Therefore, high-nickel ternary positive electrode materials are one of main objects of research on traction batteries. However, the increased nickel content obviously aggravates direct side reactions between the positive electrode active material and an electrolytic solution, and greatly deteriorates high temperature gas generation performance, which is one of bottlenecks for commercial mass production of batteries.

Currently in terms of material, main methods for improving high temperature gas generation performance all cause different degrees of damage to performance of battery cells, for example, reversible capacity per gram of the active material decreases, and cycle performance deteriorates.

SUMMARY hi view of the disadvantages in the prior art, this disclosure is intended to provide a ternary positive electrode material with low gas generation and high capacity to resolve problems in the prior art.

In order to achieve the above and other related objectives, this disclosure provides a positive electrode material, including a substrate, with a formula of the substrate being $Li_xNi_yCo_zM_kMe_pO_rA_m$, where 0.95≤x≤1.05, 0.50≤y≤0.95, 0≤z≤0.2, 0≤k≤0.4, 0≤p≤0.05, 1≤r≤2, 0≤m≤2, m+r≤2, M is selected from Mn anchor Al, Me is selected from one or more of Zr, Zn, Cu, Cr, Mg, Fe, V, Ti, Sr, Sb, Y, W, and Nb, and A is selected from one or more of N, F, S, and Cl; a coating layer is disposed on a surface of the substrate, where the coating layer includes a coating element that is selected from one or more of Al, Zr, Ba, Zn, Ti, Co, W, Y, Si, Sn, B, and P; and absorbance of nickel leachate per unit mass of the positive electrode material w≤0.7.

According to another aspect, this disclosure provides an electrochemical energy storage apparatus, including the positive electrode material according to this disclosure.

Compared with the prior art, this disclosure provides the following beneficial effects:

The positive electrode material of this disclosure has good crystal structural stability and surface inertness. Absorbance of nickel leachate of the positive electrode material is relatively low, so that side reactions between the positive electrode material and an electrolytic solution can be effectively inhibited, thereby optimizing cycle performance, improving thermal stability and alleviating gas generation.

DESCRIPTION OF EMBODIMENTS

The following describes in detail the lithium-ion battery of this disclosure and a preparation method thereof.

A first aspect of tins disclosure provides a positive electrode material, including a substrate, with a formula of the substrate being $Li_xNi_yCo_zM_kMe_pO_rA_m$, where 0.95≤x≤1.05, 0.50≤y≤0.95, 0≤z≤0.2, 0≤k≤0.4, 0≤p≤0.05, 1≤r≤2, 0≤m≤2, m+r≤2, M is selected from Mn and/or Al, Me is selected from one or more of Zr, Zn, Cu, Cr, Mg, Fe, V, Ti, Sr, Sb, Y, W, and Nb, and A is selected from one or more of N, F, S, and Cl; a coating layer is disposed on the substrate, where the coating layer includes a coating element that is selected from one or more of Al, Zr, Ba, Zn, Ti, Co, W, Y, Si, Sn, B, and P; and absorbance of nickel leachate per unit mass of the positive electrode material w≤0.7.

In an embodiment of this disclosure, a method for determining absorbance w of nickel leachate per unit mass of the positive electrode material may typically include: putting the positive electrode material of unit mass into a suitable solution, and measuring absorbance of the resultant leachate under a specified wavelength range. In a specific embodiment of this disclosure, a method for determining absorbance w of nickel leachate per unit mass of the positive electrode material may specifically include the following steps: storing 1 g of the positive electrode material into 10 mL ethanol solution with pH of about 8 to 11 and a concentration of dimethylglyoxime of 10 g/L for 24 hours; taking 5 mL of supernatant and diluting it to 10 mL of leachate by adding deionized water; and measuring absorbance of the leachate in a range of 430 nm to 570 nm by using a UV-Vis spectrophotometer.

A higher relative nickel element content in a ternary material usually indicates a larger capacity per gram of the ternary material, and is more helpful in increasing the energy density of the electrochemical energy storage apparatus. However, an increase of the relative nickel element content may cause many negative effects on overall performance of the electrochemical energy storage apparatus. For example, when the relative Ni element content in the ternary material is relatively high, the layered structure of the ternary material collapses due to mixing of $Ni^{2+}$ and $Li^+$, making it more difficult to deintercalate Li+ from the ternary material, and ultimately leading to deterioration of the cycle performance of the electrochemical energy storage apparatus. For another example, an increase of the relative Ni element content in the ternary material also reduces a thermal decomposition temperature of the ternary material, resulting in an increase in heat release and deterioration of thermal stability of the ternary material. For a further example, when the relative Ni element content in the ternary material increases, the amount of $Ni^{4+}$ with strong oxidizability also increases. When the electrolytic solution comes into contact with the ternary material the electrolytic solution and the ternary material will have more side reactions, and in order to maintain charge balance, the ternary material releases oxygen. This not only destroys a crystal structure of the ternary material, but also aggravates swelling of the electrochemical energy storage apparatus and deteriorates the storage performance of the electrochemical energy storage apparatus. Through extensive research, researchers of this application have found that, contact between the electrolytic solution and the material can be avoided to some extent by doping and surface-coating the positive electrode material in a high-nickel substrate to control the absorbance of nickel leachate of the positive electrode material to be within a suitable range, thereby optimizing cycle performance, improving thermal stability, reducing the degree of side reactions, and alleviating gas generation.

In some embodiments of this disclosure, the absorbance of nickel element per unit mass of the positive electrode material can be w≤0.7, w≤0.6, w≤0.5, w≤0.4, w≤0.3, or w≤0.2. In this disclosure, the absorbance w of nickel leachate per unit mass of the positive electrode material exceeding 0.7 indicates that the nickel element can easily leach from particles of the positive electrode material, hi this case, side reactions are prone to occur between the surface of the positive electrode material and the electrolytic solution, causing a lithium-ion battery using the positive electrode material to generate excessive gas. Lower absorbance of nickel leachate per unit mass of the positive electrode material indicates stronger stability of the crystal structure, especially the surface crystal structure, of the positive electrode material.

In the positive electrode material provided in the embodiments of this disclosure, a theoretical specific surface area $BET_1$ of the positive electrode material and an actual specific surface area $BET_2$ of the positive electrode material may typically satisfy:

$$0.3 \le (BET_2 - BET_1)/BET_1 \le 5.5;$$

where, $BET_1 = 6/(\rho \times D_v 50)$; $\rho$ is actual density of the positive electrode material, measured in $g/cm^3$; and $D_v 50$ is a particle size of the positive electrode material under a cumulative volume distribution percentage reaching 50%, measured in pro. The actual specific surface area $BET_2$ of the positive electrode material can be measured by the $N_2$ adsorption method. For details, refer to GB/T19587-2004. $(BET_2 - BET_1)/BET_1$ represents a degree of deviation between the theoretical specific surface area and the actual specific surface area of the positive electrode material, which can measure a degree of unevenness on the surface of the positive electrode material. Because material uniformity is one of the factors that affect the $BET_2$ of the positive electrode material, controlling the degree of deviation between the theoretical specific surface area and the actual specific surface area of the positive electrode material to be within a specified range can indicate a relatively good granularity and morphological uniformity of the positive electrode material. The coated positive electrode material has a relatively flat surface and fewer concave and convex structures, and therefore has a relatively small contact area with the electrolytic solution. All of these help to inhibit the leaching of Ni element from the positive electrode material while ensuring good transmission of lithium ions between secondary particles, striking a balance between high temperature gas generation and kinetics.

In the positive electrode material provided in the embodiments of this disclosure, the substrate may include secondary particles composed of primary particles. The secondary particles have a $D_v 50$ of 5 μm to 18 μm, and the particle size of the primary particles may be in the range of 0.1 μm to 1.0 μm. The $D_v 50$ is a particle size of the sample trader a cumulative volume distribution percentage reaching 50%. Specifically, the $D_v 50$ of the secondary particles may be 5 μm to 18 μm, 5 μm to 6 μm, 6 μm to 7 μm, 7 μm to 8 μm, 8 μm to 9 μm, 9 μm to 10 μm, 10 μm to 11 μm, 11 μm to 12 μm, 12 μm to 13 μm, 13 μm to 14 μm, 14 μm to 15 μm, 15 μm to 16 μm, 16 μm to 17 μm, or 17 μm to 18 μm, and preferably 8 to 15 μm. The particle size of the primary particles may be in the range 0.1 pin to 1 μm, 0.1 μm to 0.9 μm, 0.2 μm to 0.8 μm or 0.2 μm to 0.5 μm. For a ternary material with a relatively high nickel content, a relative quantity of small particle size powder has a more significant impact on residual lithium content and gas generation of the positive electrode active material. Therefore, controlling $D_v 50$ of the primary particles and that of the secondary particles of the high-nickel ternary material $Li_x Ni_y Co_z M_k Me_p O_r A_m$ with a secondary particle morphology or $Li_x Ni_y Co_z M_k Me_p O_r A_m$ with a coating layer disposed on a surface to be within specified ranges can be an effective means to solve the gassing problem. When the substrate includes secondary particles composed of primary particles, the actual specific surface area $BET_2$ of the positive electrode material may be 0.1 $m^2/g$ to 1.0 $m^2/g$, 0.1 $m^2/g$ to 0.2 $m^2/g$, 0.2 $m^2/g$ to 0.3 $m^2/g$, 0.3 $m^2/g$ to 0.4 $m^2/g$, 0.4 $m^2/g$ to 0.5 $m^2/g$, 0.5 $m^2/g$ to 0.6 $m^2/g$, 0.6 $m^2/g$ to 0.7 $m^2/g$, 0.7 $m^2/g$ to 0.8 $m^2/g$, 0.8 $m^2/g$ to 0.9 $m^2/g$, or 0.9 $m^2/g$ to 1.0 $m^2/g$. A suitable specific surface area of the positive electrode material can reduce a contact area between the electrolytic solution and the positive electrode active material, helping to inhibit side reaction, and avoid aggravating the swelling of the electrochemical energy storage apparatus because of corrosion of the electrolytic solution and damage to the crystal structure of the positive electrode active material. Such specific surface area of the positive electrode material can also be helpful in achieving relatively strong adhesion of the binder and the conductive agent to the positive electrode active material with fewer auxiliary materials in making a positive electrode slimy through mixing, thereby helping to increase the energy density of the electrochemical energy storage apparatus.

In the positive electrode material provided in the embodiments of this disclosure, the substrate may include single crystal or single-crystal-like particles. When the substrate is made of single crystal or single-crystal-like particles, the particle size $D_v 50$ of the substrate may be 1 μm to 6 μm, 1 μm to 2 μm, 2 μm to 3 μm, 3 μm to 4 μm, 4 μm to 5 μm, or 5 μm to 6 μm, and preferably, the particle size $D_v 50$ of the substrate is 2 μm to 5 μm. The single crystal or single-crystal-like particles typically refer to a positive electrode material whose particle morphology is formed by one complete particle or agglomeration of fewer than ten particles. When the positive electrode material includes single crystal or single-crystal-like particles, the actual specific surface area $BET_2$ of the positive electrode material may be 0.5 $m^2/g$ to 1.5 $m^2/g$, 0.5 $m^2/g$ to 0.6 $m^2/g$, 0.6 $m^2/g$ to 0.7 $m^2/g$, 0.7 $m^2/g$ to 0.8 $m^2/g$, 0.8 $m^2/g$ to 0.9 $m^2/g$, 0.9 $m^2/g$ to 1.0 $m^2/g$, 1.0 $m^2/g$ to 1.1 $m^2/g$, 1.1 $m^2/g$ to 1.2 $m^2/g$, 1.2 $m^2/g$ to 1.3 $m^2/g$, or 1.3 $m^2/g$ to 1.4 $m^2/g$, or 1.4 $m^2/g$ to 1.5 $m^2/g$. In the embodiments of this disclosure, when the positive electrode material includes the foregoing single crystal or single-crystal-like particles whose particle sizes and BETs are within the foregoing ranges, the positive electrode material has a more integral surface and inner crystal structure, and a smaller contact area, with the electrolytic solution, which helps to alleviate leaching of nickel dement from the particle surface.

In the positive electrode material provided in the embodiments of this disclosure, a coating element content per unit volume Mv in the positive electrode material may be 0.4 mg/cm$^3$ to 15 mg/cm$^3$, 0.4 mg/cm$^3$ to 0.6 mg/cm$^3$, 0.6 mg/cm$^3$ to 0.8 mg/cm$^3$, 0.8 mg/cm$^3$ to 1 mg/cm$^3$, 1 mg/cm$^3$ to 2 mg/cm$^3$, 2 mg/cm$^3$ to 4 mg/cm$^3$, 4 mg/cm$^3$ to 6 mg/cm$^3$, 6 mg/cm$^3$ to 8 mg/cm$^3$, 8 mg/cm$^3$ to 10 mg/cm$^3$, or 10 mg/cm$^3$ to 15 mg/cm$^3$, and preferably may be 0.8 mg/cm$^3$ to 10 mg/cm$^3$. A suitable coating element, content can usually ensure that under different volume-based particle size distributions, a balance is struck between surface modification and polarization of the positive electrode material, winch effectively alleviates the gassing issue of high capacity batteries, and optimizes their cycle and rate performances, hi the coating layer; the coating element typically exists in a form of an oxide. For example, the coating layer may include one or more of oxides of the foregoing coating elements, or include a lithium-containing oxide of the foregoing coating element and the lithium element, and specifically may include but is not limited to one or more of aluminum oxide, zirconium oxide, zinc oxide, titanium oxide, silicon oxide, tin oxide, tungsten, oxide, yttrium oxide, cobalt oxide, barium oxide, phosphorus oxide, boron oxide, and lithium aluminum oxide, lithium zirconium oxide, lithium zinc oxide, lithium magnesium oxide, lithium tungsten oxide, lithium yttrium oxide, lithium cobalt oxide, lithium barium oxide, lithium phosphorus oxide, and lithium boron oxide.

In the positive electrode material provided in the embodiments of this disclosure, the coating layer may include an inner coating layer. The inner coating layer may be located inside the substrate, and may be located on surfaces of at least some primary particles. The inner coating layer includes a coating element, where the coating element of the inner coating layer is selected from one or more of Al, Zr, Ba, Zn, Ti, Co, W, Y, Si, Sn, B, and P. In the positive electrode material, the substrate includes secondary particles composed of primary particles. Therefore, at least a portion of the coating layer may be located between the primary particles located within the secondary particles, that is, located on surfaces of at least some primary particles inside the secondary particles. This portion of coating layer may be considered as the inner coating layer. The inner coaling layer may include an oxide of the coating element. To be specific, at least a portion of the coating element in the inner coating layer may exist in its oxide or lithium-containing oxide form, and specifically may include but is not limited to one or more of aluminum oxide, zirconium oxide, zinc oxide, titanium oxide, silicon oxide, tin oxide, tungsten oxide, yttrium oxide, cobalt oxide, barium oxide, phosphorus oxide, boron oxide, and lithium aluminum oxide, lithium zirconium oxide, lithium zinc oxide, lithium magnesium oxide, lithium tungsten oxide, lithium yttrium oxide, lithium cobalt oxide, lithium barium oxide, lithium phosphorus oxide, and lithium boron oxide. Because a secondary particle is formed by closely packing several primary particles, during cycling, the secondary particles may swell or shrink in volume, causing gaps between primary particles inside the secondary particles to increase, and exposing a large amount of uncoated fresh surface. Hence, a risk of side reactions with the electrolytic solution exists. In the embodiments of this disclosure, while the secondary particles are provided with coating layers on their surfaces, coating is applied on surfaces of at least a portion of the primary particles or grain boundaries between adjacent primary particles, which can enhance the inner density of the secondary particles, improving the force acting between the inner primary particles, and further alleviating the gassing problem during cycling.

In the positive electrode material provided in the embodiments of this disclosure, the coating layer may include an outer coating layer. The outer coating layer may be located on surfaces of the secondary particles and/or a surface of the substrate. The outer coating layer includes a coating element, where the coating element of the outer coating layer is selected from one or more of Al, Zr, Ba, Zn, Ti, Co, W, Y, Si, Sn, B, and P. In the positive electrode material, the substrate includes secondary particles composed of primary particles, at least a portion of the coating layer may be located on the surfaces of the secondary particles, and the coating element in the oxide coating layer may be distributed on the surfaces of the secondary particles. The outer coating layer may include an oxide of the coating element. To be specific, at least a portion of the coating element in the inner coating layer may exist in its oxide or lithium-containing oxide form, and specifically may include but is not limited to one or more of aluminum oxide, zirconium oxide, zinc oxide, titanium oxide, silicon oxide, tin oxide, tungsten oxide, yttrium oxide, cobalt oxide, barium oxide, phosphorus oxide, boron oxide, and lithium aluminum oxide, lithium zirconium oxide, lithium zinc oxide, lithium magnesium oxide, lithium tungsten oxide, lithium yttrium oxide, lithium cobalt oxide, lithium barium oxide, lithium phosphorus oxide, and lithium boron oxide. In the positive electrode material, tire outer coating layer is a part mainly to reduce the contact area between the substrate and the electrolytic solution. The existence of the outer coating layer may effectively modify the surface of the high nickel positive electrode material, and reduce the side reactions between tire positive electrode material and the electrolytic solution, therefore effectively inhibiting gas generation of the battery.

In the positive electrode material provided in the embodiments of this disclosure, the coating layer may include at least two of the foregoing coating elements, or more specifically may include an oxide formed by at least two of the foregoing coating elements, which can improve stability of the adhesion of the coating layer to the substrate surface. In this way, the coating layer can provide some ionic conductivity and electronic conductivity, mitigating impact of the coating layer on polarization of the positive electrode material.

In the positive electrode material provided in the embodiments of this disclosure, the outer coating layer may include a continuous and/or discontinuous coating layer. A continuous coating layer may provide relatively complete protection for the substrate surface, which is conducive to stabilizing the surface structure of the positive electrode material, inhibiting the amount of nickel leaching from the positive electrode material, and inhibiting side reactions with the electrolytic solution. However, the continuous coating layer needs to have good electronic conduction and ionic conduction performance to avoid increasing impedance of an electrode plate and deteriorating kinetics of the battery. A discontinuous coating layer is advantageous in reducing the proportion of the coating layer in the substrate surface, thus retaining more ion transmission channels, but does less in improving the structural stability of the substrate surface than a continuous coating layer. In a preferred embodiment of this disclosure, the outer coating layer may include a continuous first coating layer and a discontinuous second coating layer, a composite form of the two forms. The second coating layer may be located on the surface of the first coating layer, or may be located between the first coating layer and the substrate. In a preferred embodiment of this disclosure, an area of a single cell of the discontinuous second coating layer is typically less than an area of a single cell of the first coating layer. In another preferred embodiment of this disclosure, in the outer coating layer, the second coating layer and the first coating layer may include different coating elements, so that the coating substance of the discontinuous coating layer and the coating substance of the continuous coating layer are at least partially different.

In the positive electrode material provided in the embodiments of this disclosure, the coating element contained in the outer coating layer may account for 60 wt % or above, 70 wt % or above, 80 wt % or above, 90 wt % or above, or preferably may be 80 wt % to 98 wt % of the total mass of coating element in the positive electrode material. In the embodiments of this disclosure, because the surfaces of the secondary particles are the first to contact the electrolytic solution and their relative areas are larger, the coating element is mainly distributed on the surfaces of the secondary particles. When the proportion of mass distributed on the surfaces of the secondary particles in the total mass of coating element in the positive electrode active material is above a specified value, the surface modification of the high nickel positive electrode material is relatively more significant, and the effect on inhibiting gas generation of the battery is also better.

In the positive electrode material provided in the embodiments of this disclosure, the substrate is a lithium transition metal oxide with a relatively high nickel content. In the formula of the substrate, y preferably satisfies $0.50 \leq y \leq 0.90$, and more preferably $0.70 \leq y \leq 0.90$, z preferably satisfies $0 \leq z \leq 0.15$, and more preferably $0.05 \leq z \leq 0.15$, k preferably satisfies $0 \leq k \leq 0.2$, and more preferably $0.05 \leq k \leq 0.2$, and p preferably satisfies $0 \leq p \leq 0.03$, and more preferably $0 \leq p \leq 0.025$. Specifically, the formula of the substrate $Li_xNi_yCo_zM_kMe_pO_rA_m$ may include but is not limited to
$Li_{1/3}Co_{1/3}Mn_{1/3}O_2$,
$LiNi_{0.5}Co_{0.2}Mn_{0.3}O_2$,
$LiNi_{0.5}Co_{0.25}Mn_{0.25}O_2$,
$LiNi_{0.55}Co_{0.15}Mn_{0.3}O_2$,
$LiNi_{0.55}Co_{0.1}Mn_{0.35}O_2$,
$LiNi_{0.55}Co_{0.05}Mn_{0.4}O_2$,
$LiNi_{0.6}Co_{0.2}Mn_{0.2}O_2$,
$LiNi_{0.65}Co_{0.15}Mn_{0.2}O_2$,
$LiNi_{0.65}Co_{0.12}Mn_{0.22}O_2$,
$LiNi_{0.65}Co_{0.1}Mn_{0.25}O_2$,
$LiNi_{0.65}Co_{0.55}Mn_{0.3}O_2$,
$LiNi_{0.74}Co_{0.1}Mn_{0.15}O_2$,
$LiNi_{0.8}Co_{0.1}Mn_{0.1}O_2$,
$LiNi_{0.85}Co_{0.05}Mn_{0.1}O_2$,
$LiNi_{0.88}Co_{0.05}Mn_{0.07}O_2$,
$LiNi_{0.9}Co_{0.05}Mn_{0.05}O_2$ or the like, or may be a substance resulting from partial substitution and modification of these substances with a doping element Me and/or a doping element A.

In the positive electrode material provided in the embodiments of this disclosure, for a method for measuring residual lithium on the surface of the positive electrode material, reference may be made to GBT 9725-2007 *Chemical reagent—General rule for potentiometric titration*. $Li_2CO_3$ contained in the residual lithium on the surface of the positive electrode material (that is, the mass of $Li_2CO_3$ contained in the residual lithium on the surface of the positive electrode material relative to the total mass of the positive electrode material) is generally less than 3000 ppm. Preferably, $Li_2CO_3$ contained in the residual lithium on the surface of the positive electrode material is less than 2000 ppm. LiOH contained in the residual lithium on the surface of the positive electrode material (that is, the mass of LiOH contained in the residual lithium on the surface of the positive electrode material relative to the total mass of the positive electrode material) is less than 5000 ppm. Preferably, LiOH contained in tire residual lithium on the surface of the positive electrode material is less than 4000 ppm. In an actual production process of a ternary material, due to problems of possible impurity and low melting point of a raw material lithium salt used, melting, decomposition and volatilization loss may occur on the raw material lithium salt at a relatively low temperature. Therefore, in a process of preparing the ternary material, excessive lithium salt is added to compensate for lithium loss caused during sintering. The ternary material has active oxygen anions on its surface, which react with $CO_2$ and $H_2O$ in the ah to form carbonate. Meanwhile, lithium ions migrate from then original location to the surface and form $Li_2CO_3$ on the surface of the ternary material. This process is accompanied by deoxidization of the surface of the ternary material to form a structure-distorted surface oxide layer. In addition, adding excessive lithium salt during synthesis of the ternary material results in oxides of Li being main products of the excessive lithium salt calcined at high temperature. The oxides of Li react with $CO_2$ and $H_2O$ in the air to form LiOH and $Li_2CO_3$ again, which remain on the surface of the ternary material, resulting in a relatively high pH value of the ternary material. In addition, during a charging and discharging process, $Li_2CO_3$ remaining on the surface of the ternary material decomposes to generate $CO_2$. Because the $CO_2$ gas causes a pressure difference due to a temperature difference (especially when a reaction process is accompanied by a thermal reaction), swelling of an electrochemical energy storage apparatus is intensified, and storage performance of the electrochemical energy storage apparatus is deteriorated. Providing a coating layer on the substrate surface can reduce the residual lithium content (such as LiOH or $Li_2CO_3$) on the surface of the positive electrode active material to some extent, achieving the purpose of improving storage performance of the electrochemical energy storage apparatus. In addition, providing a coating layer on the substrate surface can also reduce a probability of side reactions caused due to direct contact between the substrate and the electrolytic solution, thereby further reducing the amount of oxygen released by the positive electrode active material for balancing charges during the charging and discharging process, and reducing risks of crystal structure collapse arising therefrom. In a preferred embodiment of this disclosure, on the surface of the positive electrode material obtained by providing a coating layer on the substrate surface (that is in the outer coating layer), the amount of $Li_2CO_3$ contained is generally less than that of LiOH. On the surface of the positive electrode material, residual lithium on the surface (LiOH, $Li_2O$) is prone to react with moisture and $CO_2$ in the air to produce, for example, $Li_2CO_3$. A higher amount of $Li_2CO_3$ contained indicates a more intense reaction, and the gassing problem of the correspondingly produced battery is mote serious.

A second aspect of this disclosure provides a method for measuring absorbance of nickel leachate per unit mass of a positive electrode material for the positive electrode material according to the first aspect of this disclosure, including:

(1) preparing a solution A containing a color developing agent, a color developing enhancer, and a main solvent;

(2) immersing the positive electrode material in the solution A, and after standing, taking an upper clear solution B; and (3) measuring the absorbance of the solution B or a diluent of the solution B by using an ultraviolet-visible (UV-Vis) spectrophotometer.

The measured result can serve as the absorbance of nickel leachate of the positive electrode material.

In the method for measuring absorbance of the positive electrode material, the color developing agent is dimethylglyoxime. The main solvent may be one or more of ethanol, water, and acetone, so as to provide a reaction medium to make the leached nickel react and complex with the color developer. The color developing enhancer may include but is not limited to one or more of ammonia, NaOH, KOH, and the like, so as to provide a suitable pH for the reaction to enhance color developing sensitivity and increase color developing speed. The pH of the solution A may be 8 to 11. Alter the positive electrode material is immersed in hill contact with the solution A, the upper clear solution B is taken after standing. The solution B typically contains nickel dimethylglyoxime. The absorbance of nickel element of the positive electrode material is obtained by measuring that of the solution B or the diluent of the solution B using a spectrophotometer. The wavelength range for the absorbance test can be 430 nm to 500 nm. For example, the absorbance can be tested under a wavelength of 470 nm.

In a preferred embodiment of this disclosure, the method for measuring absorbance of nickel leachate of the positive electrode material may specifically include the following steps:

(1) using dimethylglyoxime as the color developing agent, ammonia as the color developing enhancer, and ethanol as the main solvent to configure the solution A, where the concentration of dimethylglyoxime in the solution A is 10 g/L, and the concentration of ammonia is 25 wt % to 28 wt %;

(2) adding 1 g of the positive electrode material to 10 mL of the solution A, followed by shaking and standing for 24 h, and then taking 5 mL of the upper clear solution B; and (3) adding deionized water to the solution B to obtain a 10 mL solution C, and measuring the absorbance of the solution C at a wavelength of 470 nm by using an ultraviolet-visible spectrophotometer.

In the embodiments of this disclosure, the absorbance of nickel leachate of the positive electrode material measured by an ultraviolet-visible spectrophotometer has relatively high sensitivity and accuracy, and may visually reflect structural stability of the crystal structure, especially the crystal surface, of the positive electrode material. The gassing problem of the positive electrode material can be quickly reflected without the need of a long-term cycle test of the battery. Specifically, when light strikes art atom or molecular structure, outer electrons of the atom selectively absorb electromagnetic waves of some wavelengths to form an atomic absorption spectrum. The election energy level in the molecule undergoes a transition to produce an electronic spectrum in the ultraviolet and visible light. By measuring the absorption of monochromatic light of different wavelengths by a specific substance, an absorption spectrum curve can be obtained by using wavelength as the abscissa and absorbance as the ordinate, where the wavelength at which the degree of light absorption is greatest is called the maximum absorption wavelength. Under different concentrations of the substance, the light absorption curves exhibit the same shape and the same maximum absorption wavelength, except for the different absorbance values. The application of absorbance in the field of lithium battery is also based on this principle. According to the law of light absorption (Lambert-Beer law), light absorption of a solution is related to the solution concentration, the thickness of the liquid layer and the wavelength of the incident light. If the wavelength of the incident light and the thickness of the liquid layer remain unchanged, the light absorption of the solution is only related to the solution concentration. The high nickel material contains a large amount of nickel. When a battery cell made of such material is stored in a fully charged state, high oxidation of the material promotes oxidation and decomposition of the electrolytic solution and generates a large amount of gas. The surface coating method can avoid contact between the electrolytic solution and the material to some extent, thereby reducing the degree of side reactions, which in turn alleviates the gassing problem. Undoubtedly, if the gas generation performance of the high nickel material can be determined before the raw materials are made into battery cells, the evaluation cost can be effectively reduced, which also provide a fast and effective method for material selection. A solid material has a specific degree of solubility in liquids. When a leaching speed of the material is reduced, the ion concentration in the solution is low. According to this principle, by immersing the high nickel material in a liquid and measuring a concentration of the leached nickel, a difference in gas generation of the material can be determined.

A third aspect of this disclosure provides a method for preparing the positive electrode material according to the first aspect of this disclosure, including:

providing a substrate; and forming a coating layer on a surface of the substrate.

The method for preparing the positive electrode material provided in the embodiment of this disclosure may include: providing a substrate. The method for providing the substrate should be known to those skilled in the art, which may include, for example, mixing raw materials of the substrate and performing sintering to obtain the substrate. Those skilled in the art may select suitable raw materials and proportions based on element composition of the substrate. For example, the raw materials of the substrate may include a ternary material precursor of nickel-cobalt-manganese and/or aluminum, a lithium source, an M source, a Me source, an A source, and the like, and proportions of the raw materials are typically based on proportions of the elements in the substrate. More specifically, the ternary material precursor may include but is not limited to $Ni_{1/3}Co_{1/3}Mn_{1/3}(OH)_2$,
$Ni_{0.5}Co_{0.2}Mn_{0.3}(OH)_2$,
$Ni_{0.5}Co_{0.25}Mn_{0.25}(OH)_2$,
$Ni_{0.55}Co_{0.15}Mn_{0.3}(OH)_2$,
$Ni_{0.55}Co_{0.1}Mn_{0.35}(OH)_2$,
$Ni_{0.55}Co_{0.05}Mn_{0.4}(OH)_2$,
$Ni_{0.6}Co_{0.2}Mn_{0.2}(OH)_2$,
$Ni_{0.65}Co_{0.15}Mn_{0.2}(OH)_2$,
$Ni_{0.65}Co_{0.12}Mn_{0.25}(OH)_2$,
$Ni_{0.65}Co_{0.1}Mn_{0.25}(OH)_2$,
$Ni_{0.65}Co_{0.05}Mn_{0.3}(OH)_2$,
$Ni_{0.75}Co_{0.1}Mn_{0.15}(OH)_2$,
$Ni_{0.8}Co_{0.01}Mn_{0.1}(OH)_2$,
$Ni_{0.88}Co_{0.05}Mn_{0.07}(OH)_2$,
$0.9Ni_{0.8}Mn_{0.2}(OH)_2 \cdot 0.1Al_2(OH)_3$,
$0.9Ni_{0.9}Mn_{0.1}(OH)_2 \cdot 0.1Al_2(OH)_3$, and
$0.9N_{0.9}Co_{0.05}Mn_{0.05}(OH)_2 \cdot 0.1Al_2(OH)_3$.

The lithium source may be a compound containing lithium, and the compound containing lithium may include but is not limited to one or more of LiOH H$_2$O, LiOH, Li$_2$CO$_3$, Li$_2$O, and the like. The Me source may typically be a compound containing Me element, and the compound containing Me element may be one or more of an oxide, a nitrate, and a carbonate containing at least one element of Zr, Zn, Cu, Cr, Mg, Fe, V, Ti, Sr, Sb, Y, W, and Nb. The A source may be a compound containing A element, and fee compound containing A element may be a salt containing A element, and specifically may include but is not limited to one or more of LiF, NaCl, NaBr, and the like. For another example, fee sintering condition may be 800° C. with an oxygen concentration of ≥20%. The particle morphology of the positive electrode material can be adjusted by selecting a different ternary material precursor and adjusting the synthetic process. For example, in the process of preparing the ternary material precursor, the particle size can be controlled by controlling a reaction time, a pH value, and an ammonia concentration during co-precipitation.

The method for preparing the positive electrode material provided in fee embodiment of this disclosure may further include: forming a coating layer on a substrate of fee substrate. The method for forming fee coating layer on the substrate surface should be known to those skilled in fee art, and for example, may include: sintering fee substrate under a condition wife presence of a compound containing a coating element, so as to form the coating layer on fee substrate surface. Based on parameters such as the composition of fee coating layer, and fee absorbance of nickel element of fee positive electrode material, those skilled in the art can properly select a proper type, proportion, and sintering condition for fee compound containing fee coating element. For example, fee compound containing fee coating element may be an oxide of the coating element, which specifically may include but is not limited to one or more of A$_2$O$_3$, ZrO$_2$, Ba(NO$_3$)$_2$, ZnO, SnO$_2$, SiO$_2$, TiO$_2$, CO$_2$O$_3$, WO$_3$, Y$_2$O$_5$, H$_3$BO$_3$, and P$_2$O$_5$. For another example, fee amount of fee coating element used may be 0.01 wt % to 0.5 wt %, 0.01 wt % to 0.05 wt %, 0.05 wt % to 0.1 wt %, 0.1 wt % to 0.2 wt %, 0.2 wt % to 0.3 wt %, 0.3 wt % to 0.4 wt %, or 0.4 wt % to 0.5 wt %, of the mass of the substrate. For a further example, fee sintering condition may be a high temperature of 200° C. to 700° C., 200° C. to 300° C., 300° C. to 400° C., 400° C. to 500° C., 500° C. to 600° C., or 600° C. to 700° C.

A fourth aspect of this disclosure provides an electrochemical energy storage apparatus, including the positive electrode material according to fee first aspect of this disclosure.

In fee electrochemical energy storage apparatus provided in the embodiments of this disclosure, it should be noted that fee electrochemical energy storage apparatus may be a super capacitor, a lithium-ion battery, a lithium metal battery, or a sodium ion battery. In the embodiments of this disclosure, only embodiments in which the electrochemical energy storage apparatus is a lithium-ion battery are illustrated, but this disclosure is not limited thereto.

The lithium-ion battery provided in the embodiments of this disclosure may include a positive electrode plate, a negative electrode plate, a separator disposed between the positive electrode plate and the negative electrode plate, and an electrolytic solution, where the positive electrode plate includes the positive electrode active material according to the first aspect of this disclosure. The method for preparing the lithium-ion battery should be known to those skilled in the art. For example, the positive electrode plate, the separator, and the negative electrode plate may each be a layer, so that they may be cut to a target size and then stacked in order. The stack nitty be further wound to a target size to form a battery core, which may be further combined with an electrolytic solution to form a lithium-ion battery.

In the lithium-ion battery provided in tire embodiments of this disclosure, the positive electrode plate typically includes a positive current collector and a positive electrode material layer provided on the positive current collector, where the positive electrode material layer may include the positive electrode material according to the first aspect of this disclosure, a binder, and a conductive agent. Those skilled in the art may select a suitable method for preparing the positive electrode plate, which, for example, may include the following steps: mixing the positive electrode material, the binder, and the conductive agent to form a slurry, and applying the slimy on the positive current collector. The binder typically includes a fluoropolyene-based binder, and water is generally a good solvent relative to the fluoropolyene-based binder, meaning that tire fluoropolyene-based binder usually features good solubility in water. For example, the fluoropolyene-based binder may be a derivative including but not limited to polyvinylidene fluoride (PVDF), vinylidene fluoride copolymer, or the like, or their modified derivatives (for example, carboxylic acid, acrylic, or acrylonitrile). In the positive electrode material layer, for the mass percentage of the binder, the used amount of the binder may not be too high because of the poor conductivity of the binder. Preferably, the mass percentage of the binder in the positive electrode active substance layer is less than or equal to 2 wt % so as to obtain relatively low impedance of the electrode plate. The conductive agent of the positive electrode plate may be various conductive agents suitable for (secondary) lithium-ion batteries in the field, and for example, may include but is not limited to one or more of acetylene black, conductive carbon black, vapor grown carbon fiber (VGCF), carbon nanotubes (CNT), Ketjen black, and the like. The weight of the conductive agent may be 1 wt % to 10 wt % of a total mass of the positive electrode material layer. More preferably, a weight ratio of the conductive agent to the positive electrode substance in the positive electrode plate is greater than or equal to 1.5:95.5.

In the lithium-ion battery provided in the embodiments of this disclosure, the positive current collector of the positive electrode plate may typically be a layer, and the positive current collector may typically be a structure or part that can collect current. The positive current collector may be a variety of materials suitable for use as the positive current collector of a lithium-ion battery in the art. For example, the positive current collector may include but is not limited to metal foil, and more specifically, may include but is not limited to copper foil, aluminum foil, and the like.

In the lithium-ion battery provided in the embodiments of this disclosure, the negative electrode plate typically includes a negative current collector and a negative electrode active substance layer provided on a surface of the negative current collector, and the negative electrode active substance layer typically includes a negative electrode active substance. The negative electrode active substance may be various materials suitable for use as the negative electrode active substance of a lithium-ion battery in the art, for example, may include but is not limited to one or more of graphite, soft carbon, hard carbon, carbon fiber, mesophase carbon microbeads, silicon-based material, tin-based material, lithium titanate, or other metals capable of forming alloys with lithium. The graphite may be selected from one or more of artificial graphite, natural graphite, and modified graphite. The silicon-based material may be selected from one or more of elemental silicon, a silicon-oxygen compound, a silicon-carbon composite, and a silicon alloy. The tin-based material may be selected from one or more of elemental tin, a tin-oxygen compound, and a tin alloy. The negative current collector is typically a structure or part that can collect current. The negative current collector may be a variety of materials suitable for use as the negative current collector of a lithium-ion battery in the art. For example, the negative current collector may include but is not limited to metal foil, and more specifically, may include but is not limited to copper foil and the like.

In the lithium-ion battery/provided in the embodiments of this disclosure, the separator may be of various materials suitable for lithium-ion batteries in the field, and for example, may include but is not limited to one or more of polyethylene, polypropylene, polyvinylidene fluoride, kevlar, polyethylene terephthalate, polytetrafluoroethylene, polyacrylonitrile, polyimide, polyamide, polyester, and natural fibers.

In the lithium-ion battery provided in the embodiments of this disclosure, the electrolytic solution may be various electrolytic solutions suitable for lithium-ion batteries. For example, the electrolytic solution typically includes an electrolyte and a solvent, and the electrolyte may typically include a lithium salt. More specifically, the lithium salt may be an inorganic lithium salt and/or an organic lithium salt, and may specifically include but is not limited to one or more of $LiPF_6$, $LiBF_4$, $LiN(SO_2F)_2$, (LiFSI for short), $LiN(CF_3SO_2)_2$ (LiTFSI for short), $LiClO_4$, $LiAsF_6$, $LiB(C_2O_4)_2$ (LiBOB for short), and $LiBF_2C_2O_4$ (LiDFOB for short). For another example, a concentration of the electrolyte may be in the range of 0.8 mol/L to 1.5 mol/L. The solvent may be various solvents suitable for the electrolytic solution of a lithium-ion battery in the art, and the solvent of the electrolytic solution is typically a non-aqueous solvent, preferably an organic solvent, and specifically, may include but is not limited to one or more of ethylene carbonate, propylene carbonate, butylene carbonate, pentene carbonate, dimethyl carbonate, diethyl carbonate, dipropyl carbonate, ethyl methyl carbonate, and the like, or halogenated derivatives thereof.

Generally, a higher Ni content in a ternary material generally indicates a larger capacity per gram of the ternary material, and is also more helpful in increasing the energy density of the electrochemical energy storage apparatus. However, an increased nickel content obviously aggravates direct side reactions between the positive electrode active material and the electrolytic solution, and greatly deteriorates cycle performance. Researchers of this application have found that a large amount of nickel element still remains on the surface of the ternary material processed by a traditional coating method, therefore after the battery is fully charged, many side reactions may occur due to contact between high valence nickel element on the material surface and the electrolytic solution, leading to deteriorated cycle performance. The positive electrode material in the embodiments of this disclosure has good crystal structural stability and surface inertness. The amount of the nickel element leachable from the surface of the positive electrode active substance is relatively low, which effectively inhibits side reactions between the positive electrode material and the electrolytic solution, thereby improving high temperature cycle performance and high temperature storage performance of the ternary material.

The following describes embodiments of this disclosure through specific examples. Persons skilled in the art can easily learn other advantages and effects of this disclosure based on the contents disclosed in this specification. This disclosure may also be implemented or applied according to other different embodiments, and various modifications or changes may also be made to the details in the specification based on different perspectives and applications without departing from the spirit of this disclosure.

It should be noted that process devices or apparatuses not specifically noted in the following examples all be conventional devices or apparatuses in the art.

In addition, it should be understood that the one or more method steps mentioned in this disclosure do not exclude that there may be other method steps before and after the combined steps or that other method steps may be inserted between these explicitly mentioned steps, unless otherwise specified. It should further be understood that the combination and connection relationship between one or more devices/apparatuses mentioned in this disclosure do not exclude that there may be other devices/apparatuses before and after the combined devices/apparatuses or that other devices/apparatuses may be inserted between the two explicitly mentioned devices/apparatuses, unless otherwise specified. Moreover, unless otherwise specified, numbers of the method steps are merely a tool for identifying the method steps, but are not intended to limit the order of the method steps or to limit the implementable scope of this disclosure. Alteration or adjustment of their relative relationships without substantial changes in the technical content shall be also considered as falling in the implementable scope of this disclosure.

Example 1

(1) A Specific Preparation Process of the Positive Electrode Material is as Follows:

a. Preparation of a Substrate Precursor:

Nickel sulfate, manganese sulfate, and cobalt sulfate were configured in a molar ratio 8:1:1 of Ni:Co:Mn to obtain a solution with a concentration of 1 mol/L, and the precursor $Ni_{0.8}Co_{0.1}Mn_{0.1}(OH)_2$ of a lithium-nickel transition metal oxide A with a large particle size was prepared by using the hydroxide co-precipitation method. In the process of preparing the precursor, the reaction time was 75 h to 125 h, the pH value for co-precipitation was 7.5 to 8.5, and the ammonia concentration was 1 mol/L.

b. Preparation Method of a Positive Electrode Material:

The ternary material precursor $Ni_{0.8}Co_{0.1}Mn_{0.1}(OH)_2$ and $LiOH H_2O$ were mixed in a mixer, and then the mixture was sintered in an atmosphere furnace at 800° C., followed by cooling and mechanical grinding to obtain a substrate of the ternary material. The positive electrode material substrate and the additive aluminum oxide were mixed with 3.5 $mg/cm^3$ coating element in a mixer, and then the resulting mixture was sintered in an atmosphere furnace at 450° C. to form a coating layer, and a finished positive electrode material was obtained.

The prepared positive electrode material was further used to prepare a battery, with the preparation method as described below. The performances of the prepared battery were tested, with specific parameters shown in Table 1, and test results shown in Table 2.

(2) Preparation of a Positive Electrode Plate

Step 1: The foregoing high nickel positive electrode material, a binder polyvinylidene fluoride, and a conductive agent acetylene black were mixed in a mass ratio of 98:1:1. N-methylpyrrolidone (NMP) was added. The resulting mixture was stirred by using a vacuum mixer until the mixture was stable and uniform, to obtain a positive electrode slimy. The positive electrode slurry was applied uniformly on an aluminum foil with a thickness of 12 pin in a surface density of 0.1 mg/mm² to 0.3 mg/mm².

Step 2: The coated electrode plate was dried in an oven at 100° C. to 130° C., followed by cold pressing and cutting, to obtain the positive electrode plate.

(3) Preparation of a Negative Electrode Plate:

A negative electrode active material graphite, a thickener sodium carboxymethyl cellulose, a binder styrene butadiene rubber, and a conductive agent acetylene black were mixed at a mass ratio of 97:1:1:1, deionized water was added, and the mixture was stirred by using a vacuum mixer to obtain a negative electrode slimy. The negative electrode slurry was uniformly applied onto an 8-μm-thick copper foil in 0.05 mg/mm² to 0.15 mg/mm², and the copper foil was dried at room temperature and transferred to aa oven to dry at 12° C. for 1 hour. The same processing was applied to the reverse side of the electrode plate, and then the electrode plate was cold pressed and cut to obtain a negative electrode plate.

(4) Preparation of an Electrolytic Solution:

An organic solvent was a mixture of ethylene carbonate (EC), ethyl methyl carbonate (EMC) and diethyl carbonate (DEC), where a volume ratio of EC, EMC, and DEC was 20:20:60. In an argon atmosphere glove box with water content less than 10 ppm, fully dried lithium salt $LiPF_6$ was dissolved in the organic solvent to obtain an evenly mixed electrolytic solution. Concentration of the lithium salt was 1 mol/L.

(5) Preparation of a Separator:

A 12-μm-thick polypropylene membrane was selected as a separator.

(6) Preparation of a Battery:

The positive electrode plate, the separator, and the negative electrode plate were stacked in order, so dial the separator was placed between the positive and negative electrode plates to provide separation. The stack was wound to obtain a square bare battery cell. The bare battery cell was wrapped with an aluminum-plastic film, and then baked at 80° C. for dehydrating. A finished battery was obtained after steps of injecting the corresponding non-aqueous electrolytic solution, sealing, standing, hot and cold pressing, chemical conversion, clamping, and aging.

Example 2

Basically the same as the preparation method of a positive electrode material in Example 1, except that: the coating additive was zirconium oxide, and the coating element content was 4.6 mg/cm³.

Example 3

Basically the same as the preparation method of a positive electrode material in Example 1, except that: the coating additive was titanium oxide, and the coating element content was 4.3 mg/cm³.

Example 4

Basically the same as the preparation method of a positive electrode material in Example 1, except that: the coating additive was phosphoric anhydride, and the coating element content was 4.2 mg/cm³.

Example 5

Basically the same as the preparation method of a positive electrode material in Example 1, except that: the coating additive was aluminum oxide and boron oxide, and the coating element content was 4.0 mg/cm³.

Example 6

Basically the same as the preparation method of a positive electrode material in Example 1, except that: the coating additive was titanium oxide and boron oxide, and the coating element content was 3.8 mg/cm³.

Example 7

Basically the same as the preparation method of a positive electrode material in Example 1, except that: the coating additive was boron oxide, and the coating element content was 0.4 mg/cm³.

Example 8

Basically the same as the preparation method of a positive electrode material in Example 1, except that: the coating additive was boron oxide, and the coating element content was 0.8 mg/cm³.

Example 9

Basically the same as the preparation method of a positive electrode material in Example 1, except that: the coating additive was boron oxide, and the coating element content was 10 mg/cm³.

Example 10

Basically the same as the preparation method of a positive electrode material in Example 1, except that: the coating additive was boron oxide, and the coating element content was 15 mg/cm³.

Example 11

Basically the same as the preparation method of a positive electrode material in Example 7, except that: the coating element content was 4.7 mg/cm*.

Example 12

Basically the same as the preparation method of a positive electrode material in Example 1, except that: a sintering temperature of the precursor and LiOH was 900° C., the obtained positive electrode material was made of single crystal particles, and $D_v50$ of the substrate was 6 urn; and the coating additive was boron oxide, and the coating element content was 4.2 mg/cm³.

Example 13

Basically the same as the preparation method of a positive electrode material in Example 11, except that: $D_v50$ of the substrate was 15 μm.

Example 14

Basically the same as the preparation method of a positive electrode material in Example 11, except that: $D_v50$ of the substrate was 8 μm.

Example 15

Basically the same as the preparation method of a positive electrode material in Example 11, except that: $D_v50$ of the substrate was 12 μm.

Example 16

Basically the same as the preparation method of a positive electrode material in Example 11, except that: $D_v50$ of the substrate was 18 μm.

Example 17

Basically the same as the preparation method of a positive electrode material in Example 11, except that: $D_v50$ of the substrate was 5 μm.

Example 18

Basically the same as the preparation method of a positive electrode material in Example 12, except that: $D_v50$ of the substrate was 2 μm; and the coating element content was 2.1 mg/cm$^3$.

Comparative Example 1

Basically the same as the preparation method of a positive electrode material in Example 1, except that; no coating processing was performed.

Comparative Example 2

Basically the same as the preparation method of a positive electrode material in Example 1, except that: the coating additive was magnesium oxide, and the coating element content was 4.7 mg/cm$^3$.

Comparative Example 3

Basically the same as the preparation method of a positive electrode material in Comparative Example 1, except that: the substrate was a positive electrode material made of single crystal particles with $D_v50=3.5$ μm.

Comparative Example 4

Basically the same as the preparation method of a positive electrode material in Comparative Example 3, except that: the substrate was coated with magnesium oxide, and the coating element content was 4.7 mg/cm$^3$.

Test Method (1) Method for Measuring Absorbance of Nickel Leachate Per Unit Mass of the Positive Electrode Material:

1) using dimethylglyoxime as the color developing agent, ammonia as the color developing enhancer, and ethanol as the main solvent to configure the solution A, where the concentration of dimethylglyoxime in the solution A was 10 g/L, and the concentration of ammonia was 25 to 28 wt %;

2) adding 1 g of the positive electrode material to 10 mL of the solution A, followed by shaking and standing for 24 h, and then taking 5 mL of the upper clear solution B; and 3) adding water to the solution B to obtain a 10 mL solution C, and measuring the absorbance of the solution C at a wavelength of 470 nm by using an ultraviolet-visible spectrophotometer.

(2) Cycle Performance Test of the Lithium-Ion Battery at 45° C.

The battery was charged to 4.2 V with 1 C at 2.8 V to 4.2 V at a constant temperature of 45° C., charged to a current of ≤0.05 mA at a constant voltage of 4.2 V, and after standing for 5 minutes, was then discharged to 2.8 V with 1 C. The capacity was denoted as Dn (n=0, 1, 2 . . . ). The preceding process was repeated until the capacity was decreased to 80% of the initial capacity. A quantity of cycles of the lithium-ion battery was recorded. Test results of the examples and comparative examples are shown in Table 2.

(3) Discharge Capacity Test of the Lithium-Ion Battery

The lithium-ion battery was charged to 4.2 V with 1 C at 2.8 V to 4.2 V at a constant temperature of 25° C., then charged to a current of ≤0.05 mA at a constant voltage of 4.2 V, and after standing for 5 minutes, discharged to 2.8 V with 1 C. A capacity of the lithium-ion battery was recorded, and specific results are shown in Table 2.

(4) High Temperature Gas Generation Test of the Battery:

The battery was fully charged at 1 C to 4.2 V and then placed in a thermostat at 80° C. for 10 days. A volume swelling rate of the battery was obtained by measuring an initial volume of the battery and the volume after standing for 10 days.

Volume swelling rate of the battery (%)=(Volume after standing for 10 days/Initial volume−1)×100%.

TABLE 1

| | Particle morphology | Coating layer | Coating element content per unit volume Mv(μg/cm$^3$) | $D_v50$ (μm) | (BET$_2$-BET$_1$)/BET$_1$ | BET$_2$ (m$^2$/g) | Absorbance | Li$_2$CO$_3$ (ppm) | LiOH (ppm) |
|---|---|---|---|---|---|---|---|---|---|
| Example 1 | Secondary particles | Aluminum oxide | 3.5 | 9 | 4.3 | 0.75 | 0.455 | 2315 | 3425 |
| Example 2 | Secondary particles | Zirconium oxide | 4.6 | 9 | 4.1 | 0.73 | 0.538 | 2585 | 3953 |
| Example 3 | Secondary particles | Titanium oxide | 4.3 | 9 | 3.9 | 0.69 | 0.469 | 3684 | 4851 |
| Example 4 | Secondary particles | Phosphorus oxide | 4.2 | 9 | 4.5 | 0.78 | 0.653 | 2961 | 3976 |
| Example 5 | Secondary particles | Discontinuous aluminum oxide coating layer + continuous boron oxide coating layer | 4.0 | 9 | 3.8 | 0.68 | 0.209 | 1596 | 2854 |
| Example 6 | Secondary particles | Discontinuous titanium oxide coating layer + | 3.8 | 9 | 3.3 | 0.61 | 0.227 | 1984 | 2597 |

TABLE 1-continued

| | Particle morphology | Coating layer | Coating element content per unit volume Mv(μg/cm³) | D$_v$50 (μm) | (BET$_2$-BET$_1$)/BET$_1$ | BET$_2$ (m²/g) | Absorbance | Li$_2$CO$_3$ (ppm) | LiOH (ppm) |
|---|---|---|---|---|---|---|---|---|---|
| | | continuous boron oxide coating layer | | | | | | | |
| Example 7 | Secondary particles | Boron oxide | 0.4 | 9 | 5.5 | 0.92 | 0.683 | 2874 | 3512 |
| Example 8 | Secondary particles | Boron oxide | 0.8 | 9 | 4.7 | 0.81 | 0.644 | 2850 | 3401 |
| Example 9 | Secondary particles | Boron oxide | 10 | 9 | 2.0 | 0.42 | 0.502 | 2583 | 3195 |
| Example 10 | Secondary particles | Boron oxide | 15 | 9 | 1.5 | 0.36 | 0.441 | 2256 | 3096 |
| Example 11 | Secondary particles | Boron oxide | 4.7 | 9 | 3.5 | 0.64 | 0.613 | 2354 | 3451 |
| Example 12 | Single crystal particles | Boron oxide | 4.2 | 6 | 2.3 | 0.72 | 0.329 | 2234 | 3012 |
| Example 13 | Secondary particles | Boron oxide | 4.7 | 15 | 4.6 | 0.48 | 0.286 | 2131 | 3588 |
| Example 14 | Secondary particles | Boron oxide | 4.7 | 8 | 3.9 | 0.78 | 0.385 | 2554 | 3821 |
| Example 15 | Secondary particles | Boron oxide | 4.7 | 12 | 4.5 | 0.59 | 0.43 | 2764 | 3353 |
| Example 16 | Secondary particles | Boron oxide | 4.7 | 18 | 5.3 | 0.45 | 0.337 | 2481 | 3221 |
| Example 17 | Secondary particle | Boron oxide | 4.7 | 5 | 0.8 | 0.46 | 0.432 | 2651 | 4231 |
| Example 18 | Single crystal particles | Boron oxide | 2.1 | 2 | 0.5 | 0.97 | 0.414 | 2134 | 3112 |
| Comparative Example 1 | Secondary particles | / | / | 9 | 3.2 | 0.6 | 0.7398 | 5452 | 4425 |
| Comparative Example 2 | Secondary particles | Magnesium oxide | 4.7 | 9 | 2.5 | 0.5 | 0.711 | 2324 | 3821 |
| Comparative Example 3 | Single crystal particles | / | / | 3.5 | 1.5 | 0.9 | 0.822 | 6479 | 5275 |
| Comparative Example 4 | Single crystal particles | Magnesium oxide | 4.7 | 3.5 | 1.0 | 0.74 | 0.79 | 3548 | 4673 |

TABLE 2

| | Capacity mAh/g | Quantity of cycles when capacity drops to 80% at 45° C. | Volume swelling rate of the battery after storage at 80° C. |
|---|---|---|---|
| Example 1 | 197 | 547 | 78% |
| Example 2 | 196 | 553 | 71% |
| Example 3 | 198 | 593 | 84% |
| Example 4 | 197 | 502 | 87% |
| Example 5 | 198 | 547 | 52% |
| Example 6 | 196 | 559 | 55% |
| Example 7 | 197 | 515 | 89% |
| Example 8 | 196 | 529 | 91% |
| Example 9 | 198 | 582 | 83% |
| Example 10 | 198 | 567 | 78% |
| Example 11 | 199 | 569 | 88% |
| Example 12 | 193 | 1097 | 87% |
| Example 13 | 194 | 489 | 56% |
| Example 14 | 199 | 589 | 59% |
| Example 15 | 195 | 563 | 77% |
| Example 16 | 193 | 470 | 48% |
| Example 17 | 201 | 591 | 47% |
| Example 18 | 196 | 1196 | 85% |
| Comparative Example 1 | 197 | 364 | 189% |
| Comparative Example 2 | 198 | 489 | 164% |
| Comparative Example 3 | 196 | 990 | 197% |
| Comparative Example 4 | 196 | 1050 | 154% |

It can be learned from the data in Table 1 and Table 2 that: in Comparative Examples 1 to 4, the absorbance values w of nickel leachate per unit mass of the positive electrode material all exceeded 0.7 because the high nickel ternary positive electrode materials were subject to weak binding between the coating substance and the substrate, or a coating layer with a less dense structure, or excessive concave and convex structures in the powder particle morphology. Such absorbance indicates that nickel element could easily leach from powder particles of the positive electrode material. When such positive electrode material was used in a lithium-ion battery, side reactions between the surfaces of the powder particles and the electrolytic solution were prone to occur; and therefore the lithium-ion battery using the positive electrode material generated excessive gas, so that its capacity faded quickly during high-temperature cycling and its cycle life was shortened.

However, in Examples 1 to 18, by adjusting the comprehensive influence of factors such as the coating substance of the positive electrode material, the relative coating content, and the surface morphology of particles, the absorbance of nickel leachate of the positive electrode material did not exceed 0.7. As the absorbance of nickel leachate per unit mass of the positive electrode material was relatively low, the stability of the crystal structure, especially the surface crystal structure, of the positive electrode material was stronger. Therefore, the capacity per gram of the positive electrode material measured in battery discharge was relatively high, the high temperature cycle performance was good, and the high temperature volume swelling rate was effectively suppressed. Specifically, controlling the degree of deviation between the theoretical specific surface area and the actual specific surface area of the positive electrode material to be within a specified range ensured a relatively good granularity and morphological uniformity of the positive electrode material. The coated positive electrode material had a relatively flat surface and fewer concave and convex structures, and therefore had a relatively small contact area with the electrolytic solution. All of these help to inhibit the leaching of Ni element from the positive electrode material while ensuring good transmission of lithium ions between secondary particles, striking a balance between high temperature gas generation and kinetics. When the coating layer included at least two of the foregoing coating elements, stability of adhesion of the coating layer to the substrate surface could be improved, so that the coating layer provided some ionic conductivity and electronic conductivity, mitigating impact of the coating layer on polarization of the positive electrode material. When a coating process was performed on the positive electrode material, an outer coating layer being discontinuous could reduce a proportion of the coating layer on the substrate surface, allowing more ion transmission channels to be retained, but did less in improving the structural stability of the substrate surface than a continuous coating layer. Using double-layer coating could achieve high ionic conductivity while achieving effective coating, and avoid deterioration of battery performance due to excessive leaching of nickel from the cathode material during long-term cycling.

In conclusion, this disclosure effectively overcomes various shortcomings in the prior art and is highly industrially applicable.

The foregoing embodiments only illustrate foe principles and effects of this disclosure by using examples, but are not intended to limit this disclosure. Any person familiar with this technology can make modifications or changes to the foregoing embodiments without departing from the spirit or scope of this disclosure. Therefore, all equivalent modifications or changes made by a person of ordinary skill in the technical field without departing from the spirit or technical ideas disclosed in this disclosure shah still fall within the scope of the claims of this disclosure.

What is claimed is:

1. A positive electrode material, comprising a substrate, wherein a molecular formula of the substrate is $Li_xNi_yCo_zM_kMe_pO_rA_m$, where $0.95 \leq x \leq 1.05$, $0.70 \leq y \leq 0.90$, $0.05 \leq z \leq 0.15$, $0.05 \leq k \leq 0.2$, $0 \leq p \leq 0.05$, $1 \leq r \leq 2$, $0 \leq m \leq 2$, $m+r \leq 2$, M is selected from Mn and/or Al, Me is selected from one or more of Zr, Zn, Cu, Cr, Mg, Fe, V, Ti, Sr, Sb, Y, W, and Nb, and A is selected from one or more of N, F, S, and Cl;

wherein a coating layer is disposed on the substrate, the coating layer comprises a coating element that is selected from one or more of Al, Zr, Ba, Zn, Ti, Co, W, Y, Si, Sn, B, and P;

wherein absorbance of nickel leachate per unit mass of the positive electrode material $w \leq 0.7$;

wherein a theoretical specific surface area $BET_1$ of the positive electrode material and an actual specific surface area $BET_2$ of the positive electrode material satisfies the following condition:

$0.3 \leq (BET_2 - BET_1)/BET_1 \leq 5.5$;

wherein, $BET_1 = 6/(\rho \times D_v 50)$;

$\rho$ is actual density of the positive electrode material, measured in $g/cm^3$; and $D_{v50}$ is a particle size of the positive electrode material under a cumulative volume distribution percentage reaching 50%, measured in μm;

a coating element content per unit volume Mv in the positive electrode material is 0.4 mg/cm$^3$ to 15 mg/cm$^3$; and in residual lithium on a surface of the positive electrode material, $Li_2CO_3$ is less than 3000 ppm, and LiOH is less than 5000 ppm.

2. The positive electrode material according to claim 1, wherein when the substrate comprises secondary particles composed of primary particles, the actual specific surface area $BET_2$ of the positive electrode material is 0.1 m$^2$/g to 1.0 m$^2$/g, and $D_v 50$ is 5 μm to 18 μm.

3. The positive electrode material according to claim 1, wherein the substrate comprises single crystal or single-crystal-like particles, the actual specific surface area $BET_2$ of the positive electrode material is 0.5 m$^2$/g to 1.5 m$^2$/g, and $D_v 50$ is 1 μm to 6 μm.

4. The positive electrode material according to claim 1, wherein the coating element content per unit volume My in the positive electrode material is 0.8 mg/cm$^3$ to 10 mg/cm$^3$.

5. The positive electrode material according to claim 1, wherein the coating layer comprises an inner coating layer, the inner coating layer is located on surfaces of at least some primary particles inside the substrate, and the inner coating layer comprises a coating element, wherein the coating element of the inner coating layer is selected from one or more of Al, Zr, Ba, Zn, Ti, Co, W, Y, Si, Sn, B, and P.

6. The positive electrode material according to claim 1, wherein the coating layer comprises an outer coating layer, the outer coating layer is located on a surface of the substrate, and the outer coating layer comprises a coating element, wherein the coating element of the outer coating layer is selected from one or more of Al, Zr, Ba, Zn, Ti, Co, W, Y, Si, Sn, B, and P.

7. The positive electrode material according to claim 6, wherein the outer coating layer comprises a continuous and/or discontinuous coating layer.

8. The positive electrode material according to claim 6, wherein the outer coating layer comprises a continuous first coating layer and a discontinuous second coating layer.

9. The positive electrode material according to claim 8, wherein the second coating layer and the first coating layer comprise different coating elements.

10. The positive electrode material according to claim 1, wherein in the molecular formula of the substrate, $0 \leq p \leq 0.03$.

11. The positive electrode material according to claim 1, wherein in the residual lithium on the surface of the positive electrode material, $Li_2CO_3$ content is less than LiOH content.

12. An electrochemical energy storage apparatus, comprising the positive electrode material according to claim 1.

* * * * *